UNITED STATES PATENT OFFICE.

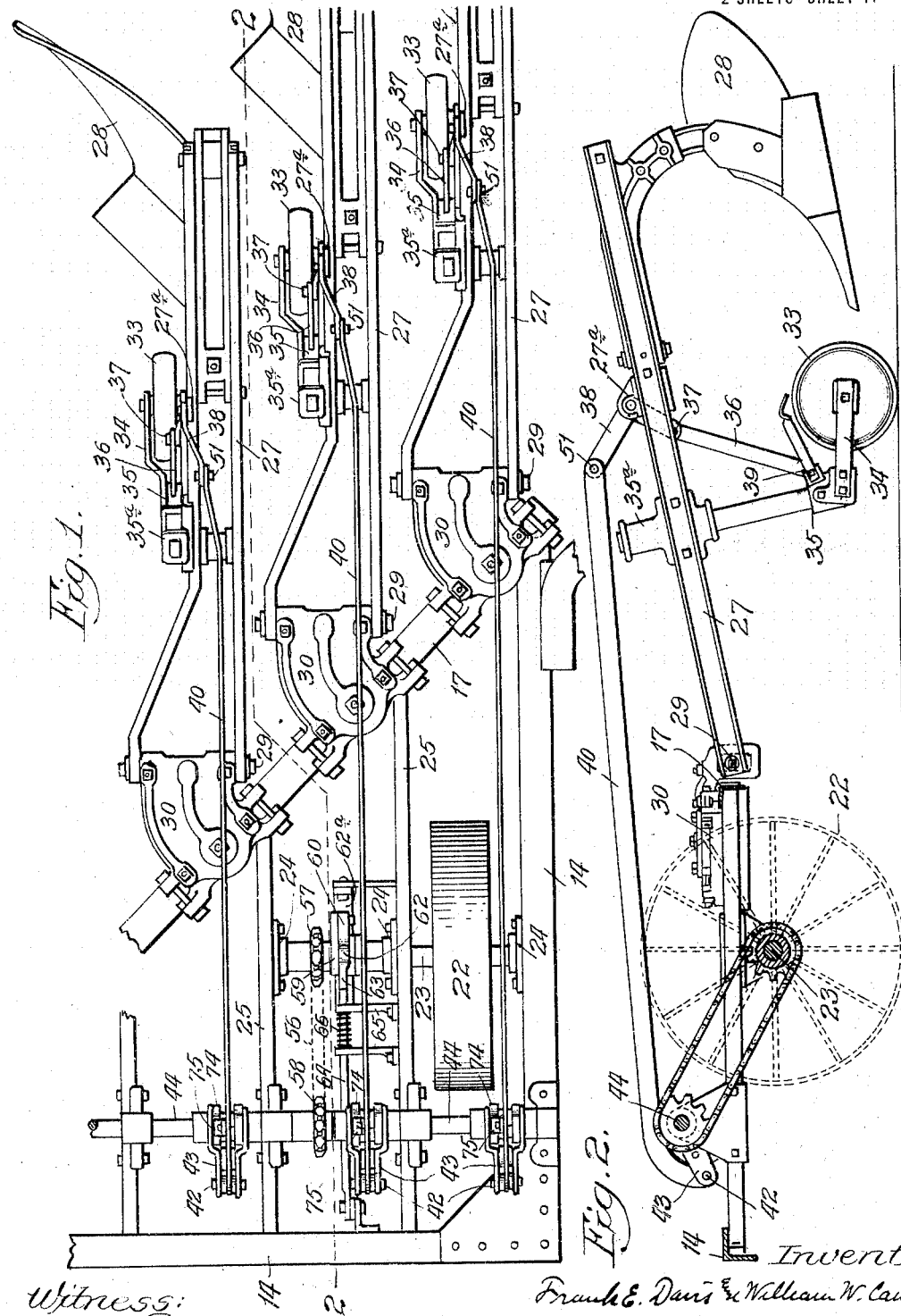

FRANK E. DAVIS AND WILLIAM W. CAMERON, OF LA CROSSE, WISCONSIN, ASSIGNORS TO LA CROSSE PLOW CO., OF LA CROSSE, WISCONSIN, A CORPORATION OF WISCONSIN.

PLOW.

1,308,228.  Specification of Letters Patent.  Patented July 1, 1919.

Original application filed April 18, 1913, Serial No. 761,928. Divided and this application filed October 21, 1918. Serial No. 259,068.

*To all whom it may concern:*

Be it known that we, FRANK E. DAVIS and WILLIAM W. CAMERON, citizens of the United States, and residents of La Crosse, in the county of La Crosse and State of Wisconsin, respectively, have invented certain new and useful Improvements in Plows, of which the following is a full, clear, and exact description.

The invention relates to plows in which provision is made for raising the plowshares by power derived from one of the carrying wheels.

The present application is a division of Serial No. 761,928, filed April 18, 1913.

In power lift plows in which the power is derived from one of the carrying wheels on which the frame of the plow is supported, and in which there is a transverse shaft for operating the plow-lifting connections, it is advantageous to avoid running parts on the shaft while the lifting mechanism is idle, because an operator watching the plowing operation from the tractor is frequently required to step on the front portion of the plow-frame for closer observation of the plows and their work.

The object of the present invention is to provide an improved power lift mechanism in which all of the parts on the power lift shaft are idle, except during a lifting or lowering operation.

The invention consists in the several novel features hereinafter set forth and more particularly defined by claims at the conclusion hereof.

Figure 3:
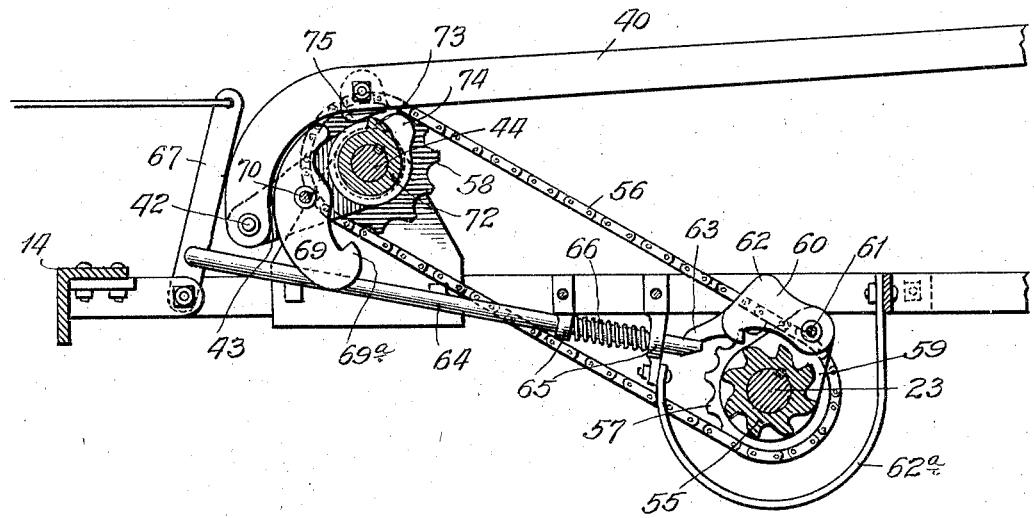
Figure 4:
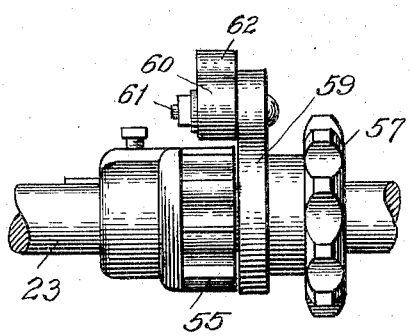
Figure 5:
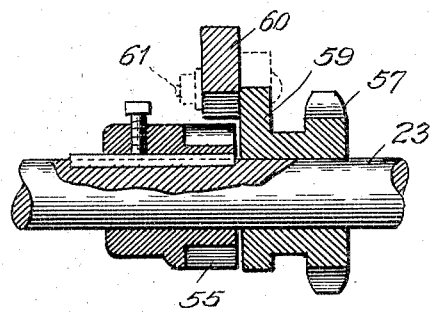

In the drawings: Figure 1 is a plan of a portion of a plow embodying the invention. Fig. 2 is a vertical section taken on line 2—2 of Fig. 1. Fig. 3 is a detail, parts being shown in section, of the plow lifting and lowering connection and the controlling device for the clutch. Fig. 4 is a detail rear elevation of the clutch. Fig. 5 is a section of the same.

A plow frame 14 is sustained by any desired number of carrying wheels, including a land-wheel 22, which is mounted on an axle 23 which is mounted in suitable bearings 24 which are secured to bars 25 of the frame 14. Wheel 22 is fixedly secured to the axle 23 to drive the clutch for operating the plow-lifting mechanism.

The plow comprises plow-beams 27 in desired number, each having a plowshare 28 suitably connected thereto. The front of each beam 27 is pivoted as at 29 to a bracket 30 which is secured to the rail 17 of the frame 14. A gage wheel 33 is provided for each plow-beam and carries a fork 34 on the lower end of a standard 35 which is slidably held in a bracket 35ª fixed to said beam. The plow-shifting mechanism for each beam comprises a link 36 which is pivoted, as at 39, to the lower end of a standard 35 and at 37 to one arm of a bell-crank lever 38 which is pivoted to a lug 27ª on the beam, a link 40 pivoted to the other arm of the bell-crank at 51. Link 40 has its front end curved downwardly and pivoted at 42 to an arm 43 which is pivoted on a shaft 44. The pivotal connections of arm 43, link 40 and lever 38 are relatively disposed to permit the linkage to pass into dead-center relation and cause the plow-beam to be automatically locked or held in raised position, as shown in Fig. 2.

A ratchet wheel 55 is fixed on axle 23 and is constantly driven by the power-wheel 22. A driving connection between the axle 23 and the power-lift shaft 44 comprises a sprocket chain 56, a sprocket 57, which is loose on the axle 23, and a sprocket 58 fixed on the shaft 44. An automatically releasable clutch comprises an arm 59 on sprocket 57, and a dog 60 pivoted as at 61 to the outer end of said arm. A weighted portion 62 on dog 60 normally throws the dog into engagement with ratchet 55 and an abutment 63 is formed on said dog and is adapted to engage a controller-rod 64 and be arrested thereby after one complete revolution of the clutch to automatically disengage the dog from the ratchet. A fixed guide 62ª serves to hold the dog in engagement with the ratchet during a portion of each revolution of the dog. Controller-rod 64 is slidably mounted in guides 65 on the frame, and a spring 66 serves to normally press the rear end of said rod into the path of abutment 63. The front end of rod 64 is pivoted to a controller-lever 67 which is adapted to be operated by a cable or rod extending to the tractor. When lever 67 is moved forwardly, rod 64 will be withdrawn from the path of abutment 63, dog 60 will drop into engagement with ratchet 55, and the clutch will be driven one complete revolution, at the end of which, abutment 63 will be arrested by controller-rod 64 to disconnect the dog from ratchet-wheel 55. Resultantly, each time lever 67 is operated, the clutch will drive chain 56 to drive the plow-shifting shaft 44 one complete revolution, at the end of which, the clutch will be automatically thrown out of action.

A dog 69 is pivoted to each arm 43, as at 70, and said arm is preferably formed of dual sections between which the dog is held. Between the hubs of the arm-sections, a collar 72 which is provided with a tooth 73 is fixed on shaft 44 to engage dog 69 and shift arm 43 to lift the plow-beam. When the plow-beam is lowered, the end 69ª of dog 69 is in the path of tooth 73. Tooth 73 serves to engage the end of dog 69 and to shift arm 43 and its plow-shifting linkage to raise the plow-beam. A tappet 74 on one side of collar 72 is adapted to engage a lug 75 which is secured to link 40 and serves to lift said link a short distance. Said tappet serves as power-operated mechanism for moving arm 43 to shift link 40 across its "dead-center" so that the plow and beam will be released to fall by gravity.

Assuming the plow-shifting mechanism to be in the position shown in Fig. 3 and the plows raised, the latter will be held by the self-locking or "dead-center" relation of the lifting-linkage. When it is desired to lower the plows, lever 67 will be pulled forwardly to render the clutch operative and cause the clutch to drive shaft 44 one complete revolution, during which the tappet 74 will engage lug 75 to lift the curved end of link 40 above the dead-center, and arm 43 will be swung upwardly, so that the weight of the beam and plow will be applied to cause the plow to drop, the lifting-linkage being free to permit this movement when the linkage crosses its dead-center.

When the plows are in the ground, and it is desired to raise them, the operator will again pull lever 67 forward to permit the clutch-dog 60 to engage ratchet 55 and again cause shaft 44 to be driven one complete revolution, and during this movement, tooth 73 will catch dog 69 and swing arm 43 forwardly to operate link 40 and raise the plow. The lower end of dog 69 is of sufficient weight to swing automatically out of engagement with tooth 73 when curved end 40ª of link 40 has passed the dead-center; and when the dog is released, the tail of the dog contacts with link 40 to prevent the dog from swinging back into engagement with tooth 73 until the link 40 has been raised during the succeeding lowering operation. Resultantly, the dog will be released from shaft 44 as soon as the lifting-mechanism has raised its plow.

The plows are disposed to operate in succession and the operating device for the several plow-shifting mechanisms is operated successively to cause the plows to enter the ground substantially on a line transverse to the line of draft and to cause them to be correspondingly raised.

The invention exemplifies the power-lift mechanism, for plows in which all the parts on the power-lift shaft are idle, except when the plows are being raised or lowered and in which the driving connection between the axle of the power-wheel and the intermittently-operated power-lift shaft are idle, except during the operation of the lifting-mechanism so that there will be no danger of injury to the operator from running parts on the front of the plow-frame while the plow is in operation.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. The combination with a frame, a series of plow-carrying structures, a lifting connection for each of said structures, carrying-wheels comprising a traction wheel, an axle on which the traction wheel is mounted, a clutch mounted on the axle and driven by said traction wheel, power-operated mechanism for operating said lifting-connections comprising a shaft having means thereon for operating the connections, a driving-connection between the clutch and said shaft, and controlling-means including an automatic throw-out for the clutch on the axle, the driving-connection between the clutch and the shaft being inoperative when the clutch is disconnected and being operative only when the shaft is being operated, said shaft being driven intermittently in one direction by the power operated mechanism.

2. The combination of a frame, a series of plow-carrying structures, a lifting connection for each of said structures, carrying-wheels comprising a traction wheel, an axle on which the traction wheel is mounted, a clutch mounted on the axle and driven by said traction wheel, power-operated mechanism for operating said lifting-connections comprising a shaft having means thereon for operating the connections, a chain-connection between the clutch and said shaft, and controlling means including an automatic throw-out for the clutch on the axle, the chain connection between the clutch and the shaft being inoperative when the clutch is inoperative, and being operated only when the shaft is operated, said shaft being driven intermittently in one direction by the power-operated mechanism.

FRANK E. DAVIS.
WILLIAM W. CAMERON.